Feb. 28, 1939.                H. MASON                2,149,223
                           ELECTRICAL CABLE
                        Filed April 15, 1936         2 Sheets-Sheet 1

| FIG. 4 | FIG. 5 | FIG. 6 | FIG. 3 |
|---|---|---|---|
|  |  |  |  |

| FIG. 7 | FIG. 8 | FIG. 9 |
|---|---|---|
|  |  |  |

| FIG. 10 | FIG. 11 | FIG. 12 | FIG. 13 |
|---|---|---|---|
|  |  |  |  |

INVENTOR
H. MASON
BY Eugene G. Brown
ATTORNEY

Feb. 28, 1939.   H. MASON   2,149,223
ELECTRICAL CABLE
Filed April 15, 1936   2 Sheets-Sheet 2
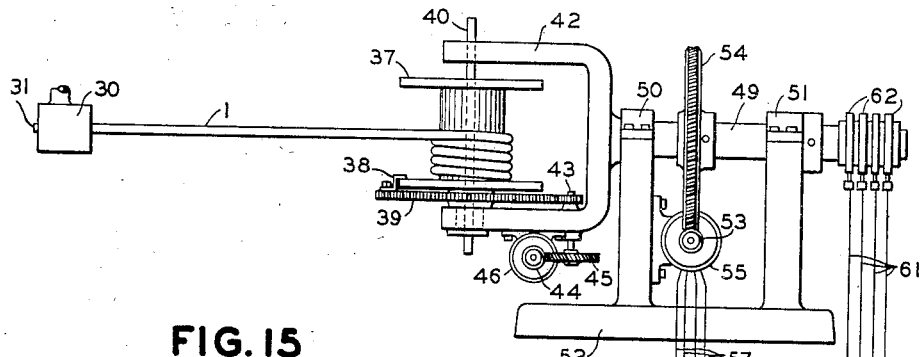
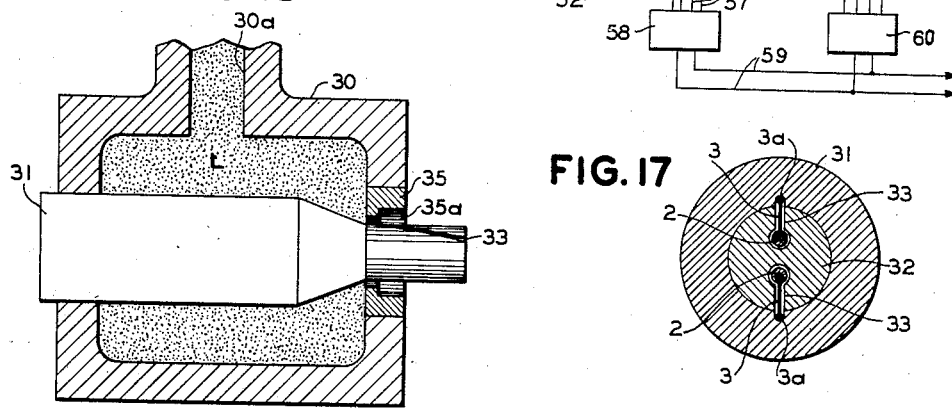
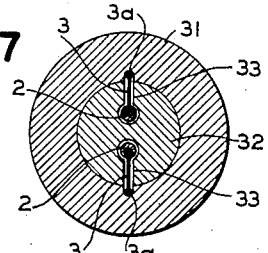
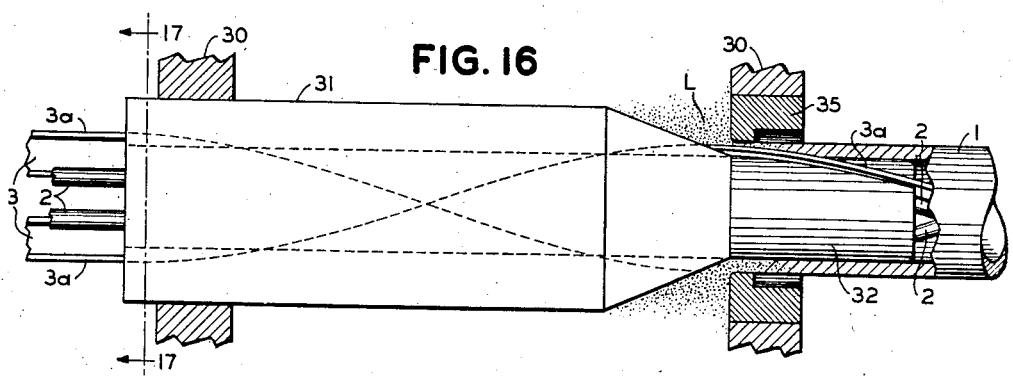
INVENTOR
H. MASON
BY
Eugene C. Brown
ATTORNEY Patented Feb. 28, 1939

2,149,223

UNITED STATES PATENT OFFICE 2,149,223

ELECTRICAL CABLE

Hobart Mason, Westfield, N. J., assignor to The Western Union Telegraph Company, New York, N. Y., a corporation of New York Application April 15, 1936, Serial No. 74,555

12 Claims. (Cl. 174—27)

This invention relates to an electrical cable, and especially to a cable adapted to transmit high frequency currents for communication purposes with low attenuation and freedom from external disturbing electric fields over a wide range of frequencies.

The range of frequencies which may be transmitted over unshielded conductors is limited by interference from adjacent conductors and other external disturbing fields, and therefore for high frequency circuits it has heretofore been the practice to enclose a small number of conductors within a conducting shield or pipe. These high frequency pipes, however, have serious disadvantages in that solid dielectric spacers are required to position the conductors within the shield, which spacers introduce substantial dielectric losses with resulting undesirable attenuation, particularly at the higher frequencies. Furthermore, it has been found extremely difficult to maintain constant and invariable the spacing between the conductors and between each conductor and the shield. Also, the relatively short leakage path present between the conductors in structures of the type heretofore proposed has further increased the attenuation of the circuit at high frequencies.

An object of the invention is a high frequency cable in which dielectric losses are substantially eliminated, with consequent reduction in the attenuation of the system at high frequencies.

Another object is a high frequency cable in which the dielectric losses are substantially reduced, and in which the spacing between the conductors and between each conductor and the cable sheath is maintained constant and invariable.

A further object is a high frequency cable comprising a plurality of conductors, in which the leakage path between the conductors is substantially increased.

The invention further resides in an electrical cable having the novel features of construction, combination and arrangement of parts hereinafter described and claimed.

In order to describe the invention, and for illustration of several of the various forms it may take, reference is had to the accompanying drawings, in which:

Fig. 3 shows the cable of Fig. 2 modified to carry an additional conductor;

Figs. 4 to 9 are perspective views of various forms of insulating strips for supporting the conductors within the cable sheath;

Figs. 10 to 13 illustrate various forms which the conductors may take, and suitable methods of securing them to the insulating strips;

Figure 1:
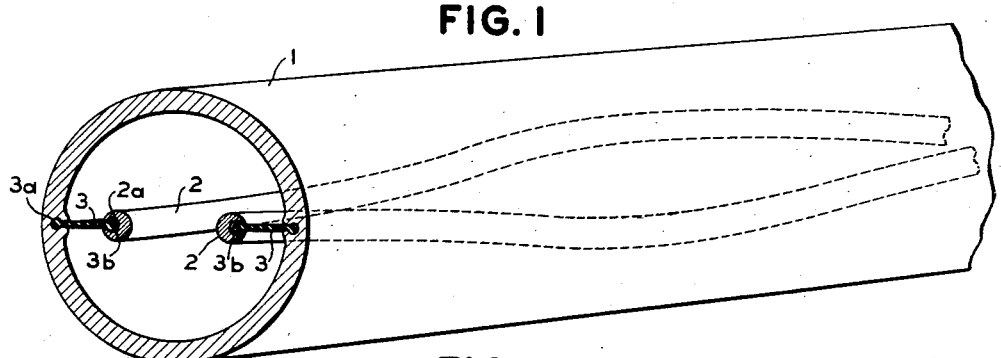
Fig. 1 is a view of a length of a cable constructed in accordance with the invention.

Fig. 14 discloses one method of making a lead sheathed cable of the form shown in Fig. 1;

Figs. 15 and 16 show various details of the lead press and core box employed in the method of Fig. 14; and Fig. 17 is a cross-sectional view of the core box taken along the line 17—17 of Fig. 16.

Referring now to Fig. 1 of the drawings, there is shown a high frequency cable comprising a lead sheath 1 and two symmetrically arranged conductors 2 within the sheath. In order that the attenuation may be as small as possible at high frequencies, the dielectric losses and the leakage loss between the conductors should be as small as possible. To accomplish this each conductor 2 is supported by a substantially rigid strip or ribbon 3 of insulating material which extends longitudinally of the cable. Each conductor 2 is firmly affixed to the inner edge of one of the strips, and the outer edge of each strip is secured to the sheath 1, each strip extending inwardly in a radial direction from the sheath toward the axis of the cable. In the form shown in Fig. 1, each strip 3 has enlarged or beaded portions 3a and 3b at its opposite edges, the portion 3b being received within an apertured portion 2a of the conductor, and the portion 3a being embedded in the lead sheath. Preferably, the dielectric medium intermediate the conductors comprises an air or an inert gas which, since they comprise dielectrics of the non-solid type, introduce substantially no dielectric losses and also cause no leakage loss between the conductors. Also, the sheath may be evacuated to provide a non-solid dielectric zone intermediate the conductors.

The material of the insulating strip preferably is such that across its width it is substantially rigid so that the conductor at the inner edge of the strip is subtantially immovable relative to the surrounding sheath. On the other hand, the insulating strip should be sufficiently flexible in a lengthwise direction to permit it to bend without injury to the extent necessary when the completed cable is wound up on a cable reel or is erected overhead or underground according to customary practices. The strip may comprise vulcanized fibre, hard rubber, certain phenolic condensation products, fabrics impregnated with certain resin compounds, and other insulating materials customarily supplied in sheet or in molded form suitable for the purpose. The strip should, of course, be composed of a dielectric material of small loss angle, low conductivity, and low dielectric constant. The choice of material will take into consideration, on the one hand, the proper balance between flexibility and rigidity and, on the other hand, the dielectric characteristics.

Preferably, and as shown in Fig. 1, helical strips 3 are employed whereby the strips are continuously transposed with respect to each other along the cable to transpose the conductors 2 supported thereby. The pitch of the helical strips will depend upon various factors, such as the dimensions of the sheath and conductors, the spacing therebetween, the frequency of the currents transmitted through the cable, the purpose for which the cable is to be used, etc. For example, for use with high frequency communication circuits, one twist every two or three feet of the insulating strips and conductors has been found satisfactory.

The insulating strip may be in the form of a ribbon 12, such as shown in Fig. 4, or it may be a ribbon 13, Fig. 5, having grooves 13a for keying the conductor thereto. Also, as above stated and shown in detail in Fig. 6, the ribbon may have enlarged or beaded portions 3a and 3b at its edges to improve the firmness of the connection between the strip and the metal conductor 2 on the one edge and between the strip and the metal sheath 1 at the other edge. Another form is shown in Fig. 7 in which the strip 15 has perforations 16 along an edge to accomplish a keying effect. To reduce even further the amount of solid dielectric material within or adjacent to the electric field of the conductors, a ribbon 17, Fig. 8, which is perforated at 18, may be employed, which form reduces the amount of dielectric material within the sheath while giving the necessary firm support to the conductor. The strip in Fig. 8 may be further modified, as shown in Fig. 9, to provide enlarged or beaded edges 19a and 19b to the strip 19 which is perforated at 18 to reduce the amount of solid dielectric material.

Each conductor, preferably of copper, may be fastened along the inner edge of the insulating strip by pressing or crimping it on, as shown in Fig. 1. The conductor may have various configurations; as shown in Fig. 10 the conductor 21 may have a square formation; in Fig. 11 the conductor 22 is shown as cylindrical in shape; whereas in Fig. 12, conductor 23 has a crescent-like cross section. For the higher frequencies the material in or near the interior of the conductor is of little value and the conductor may take a form such that when it is in place, it is a substantially hollow tube, as shown at 24 in Fig. 13.

While the sheath 1 shown in Fig. 1 preferably is analogous to the exterior waterproof sheath of present cable practice, nevertheless, for high frequency use this sheath may be designed principally for the purpose of supporting the conductors and shielding them from external disturbing fields, but not providing the requisite waterproofing. In such a case the waterproofing may be provided by a further covering exterior to the sheath 1, which covering may be of lead or other metal, or may comprise rubber or other waterproof materials commonly employed in practice in electrical cables. Furthermore, a plurality of structures such as above described may be grouped together and the waterproofing for the entire group provided by an outer covering of lead, rubber or other suitable material surrounding the whole group. This arrangement will be particularly applicable where simultaneous two-way communication at high frequencies is desired over a given route, in which case two such structures as described and included within a single waterproof sheath will be adequate, and the whole assembly can be suspended upon poles or installed in underground ducts as a single cable, the splicing operation alone involving treatment different from the present practice.

As above stated, the invention is especially applicable to high frequency cables for communication purposes, but it may advantageously be employed for power cables, particularly high tension cables. Also, for certain purposes the cable may be advantageously employed with a single conductor.

Since there is no solid dielectric material between the conductors 2, the dielectric losses will be reduced to a minimum. While the electric fields about the conductors 2 will include the dielectric strips 3, nevertheless, there is no substantial flux concentration at any point in the fields in which the strips 3 are located, the strong flux concentration occurring in the field intermediate the two conductors. The cable may advantageously be used for high voltage power service since there is no necessity for interposing any solid insulating material between the conductors, and therefore there is less liability of heating and breakdown occurring. Such a cable may be filled with an oil of the type now commonly employed in power cables, and since there is no solid insulating material intermediate the conductors, in the event of any arcing between the conductors the oil can readily extinguish the same.

It will also be noted that the leakage path between the conductors is appreciably lengthened by reason of the foregoing construction, e. g., the leakage path from one of the conductors 2 to the other conductor is across one of the strips 3, through the sheath 1, and across the other insulating strip 3, this distance being much greater than that obtained in cables of the type heretofore employed. At high frequencies this increase in the leakage path between the conductors materially reduces the attenuation of the circuit.

Figure 2:
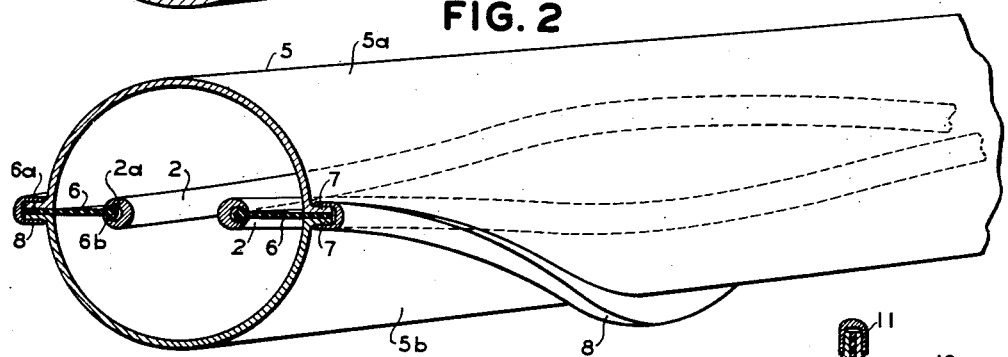
Fig. 2 shows a length of another form of cable embodying the invention.
Figure 2:
Figure 2:
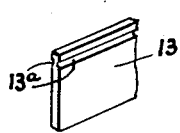
Figure 2:
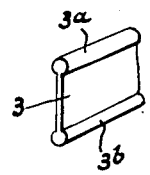
Figure 2:
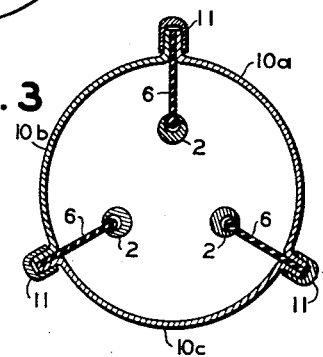
Figure 2:
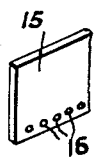
Figure 2:
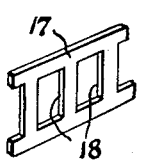
Figure 2:
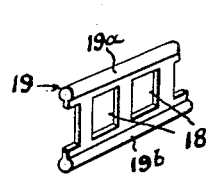
Figure 2:
Figure 2:
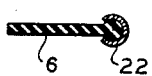
Figure 2:
Figure 2:
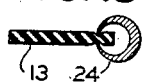

Referring to Fig. 2, there is shown a modification in which the sheath 5 is composed of two longitudinally extending segmental sections 5a and 5b. In this form the sheath preferably is made of a metal other than lead, for example, sheet copper rolled, drawn, or otherwise fabricated into form and assembled as shown in the figure. The abutting flanged edges 7 of the sections of the sheath may be fastened together in a water-tight manner by compression or by soldering, brazing or welding, and preferably, strips 8 may be employed to clamp the sections together and to protect the joints. In this form the insulating strips 6 have their outer edges clamped between the flanged portions 7 of the sections 5a and 5b.

Fig. 3 shows how the arrangement of Fig. 2 may be adapted for a three conductor cable. In this case the sheath comprises three longitudinally extending segmental sections 10a, 10b and 10c, clamping strips 11 being preferably employed to clamp the sections together. Obviously a greater number of conductors could be similarly assembled.

In each of the foregoing modifications it will be seen that not only are the dielectric losses substantially reduced and the leakage path between the conductors substantially increased, but also the spacing between the conductors and between each conductor and the cable sheath is maintained constant and invariable at every point along the conductors throughout their entire length. Thus, there is no displacement of the conductors in service with resulting change in the characteristics of the cable, and this is so even though the cable makes various bends which it ordinarily has to do in practice. When the cable is wound up on a cable reel, the insulating strips 3 and 6 are sufficiently flexible to permit a slight temporary lateral displacement of the inner edges of the strips at those points where undue stress would otherwise be introduced due to the curvature of the reel.

Figs. 14 to 17 illustrate one method of making the cable of Fig. 1, which method is an adaptation of present methods of extruding lead sheath on paper insulated cable. As shown in the drawings, the core box 30 (shown in detail in Figs. 15 to 17) receives hot lead under pressure through the inlet 30a, and is fitted with a core 31 which, instead of being axially bored for passage of a paper wrapped bundle of conductors, is pierced with two helical grooves 33 which carry the insulating strips 3 with their attached conductors 2 and impart to them the helical formation that is desired in the finished product. At the point of extrusion 35a of the die 35, the conformation of the core 31 and the slots 33 is such that the requisite portion (including the enlarged portion 3a) of each insulating strip projects beyond the core, as shown in Figs. 16 and 17, and thereupon becomes embedded in the lead of the sheath as its extrusion occurs, the lead L in the core box flowing under pressure through the die 35.

Because of the helical twist of the conductors, it is necessary that the entire cable revolve about the axis of extrusion as it progresses to the winding-up reel 37, Fig. 14, which reel is clamped by a dog 38 to the gear wheel 39 mounted to rotate upon the shaft 40. To effect this, the reel 37, besides having the ordinary motion upon its axis 40 to reel up the cable as it comes from the core box, is at the same time revolved upon an axis substantially coincident with the axis of extrusion. For this purpose the shaft 40 which supports the reel 37 is mounted in a frame work 42, which framework is carried by and rotates with a revolving spindle 49 mounted in bearings 50 and 51 on the frame structure 52. The gear wheel 39 is rotated by means of a pinion 43 which, in turn, is rotated by a worm and gear 44 and 45 driven by a motor 46. The rotation of the spindle 49 is effected by means of a worm and gear 53, 54, driven by a motor 55. Power conductors 59 supply current to a speed control device 58 which, through the conductors 57, controls the speed of the motor 55. The power supply 59 is also connected through a second speed control device 60 which, in turn, supplies current through conductors 61 and collector rings 62 to control the speed of the motor 46.

Regarding the modifications shown in Figs. 2 and 3, the various segmental sections 5a, 5b and 10 to 10c may be pressed, stamped or rolled from sheet metal in suitable lengths, and these sections and the insulating strips with their conductors assembled and joined in any suitable manner to form a cable of desired length.

The improvements specifically shown and described by which I obtain the foregoing results may obviously be changed and modified in various ways without departing from the invention, and the invention therefore is not limited except as indicated by the scope of the appended claims.

What I claim is:

1. An electrical cable comprising a sheath of conductive material, a plurality of conductors within said sheath, means comprising solid dielectric material in the form of flexible strips extending longitudinally of the cable and extending between the sheath and conductors for supporting the conductors, the dielectric material of said strips being disposed in such manner that substantially none of the material is interposed between the adjacent electric fields set up about the respective conductors when current is flowing therein.

2. An electrical cable comprising a sheath of conductive material, a plurality of conductors within said sheath, means comprising solid dielectric material in the form of flexible strips extending longitudinally of the cable and extending between the sheath and the conductors for supporting the conductors, the dielectric material of said strips terminating at the conductors and at the sheath in such manner as to prevent the interposition of solid dielectric material between the adjacent electric fields set up about the respective conductors when current is flowing therein.

3. An electrical cable comprising a sheath of conductive material, a conductor within said sheath, a supporting strip of insulation extending longitudinally of the cable, said strip having one edge thereof secured to and supported by the sheath and the other edge thereof supporting the conductor.

4. An electrical cable comprising a metal sheath, a plurality of conductors within said sheath, supporting strips of insulation extending longitudinally of the cable, each supporting strip being flexible in a longitudinal direction and relatively inflexible in a transverse direction, each strip having one edge thereof integrally secured to the sheath and the other edge supporting one of the conductors.

5. An electrical cable comprising a metal sheath, a plurality of conductors within said sheath, supporting strips of insulation extending longitudinally of the cable, each supporting strip extending in a transverse direction from the sheath inwardly toward the axis of the cable, each strip having the outer edge thereof secured to the sheath and the inner edge thereof supporting one of the conductors in fixed position with respect to the remainder and with respect to the sheath.

6. An electrical cable comprising a metal sheath and a plurality of conductors within said sheath, supporting strips of insulation extending longitudinally of the cable, each supporting strip being individual to one of the conductors and having the outer edge thereof embedded in the metal of the sheath and the inner edge thereof supporting the conductor individual thereto.

7. An electrical cable comprising a metal sheath and a plurality of conductors within said sheath, supporting strips of insulation extending longitudinally of the cable, each supporting strip being individual to one of the conductors and having means on the outer edge thereof keying the strip to the sheath, the inner edge of the strip supporting the conductor individual thereto.

8. An electrical cable comprising a metal sheath, a plurality of conductors within said sheath, supporting strips of insulation extending longitudinally of the cable, each strip being individual to one of the conductors and having one edge thereof secured to the sheath and the other edge supporting the conductor individual thereto, said strips being transposed with respect to each other along the cable sheath to transpose the conductors supported thereby.

9. An electrical cable comprising a sheath, a plurality of conductors within said sheath, helical strips of insulation extending longitudinally of the cable, each strip being individual to one of the conductors and having one edge thereof secured to the sheath and the other edge supporting the conductor individual thereto, said strips being transposed with respect to each other along the cable to transpose the conductors supported thereby.

10. An electric cable comprising an extruded metal sheath, a conductor within said sheath, a supporting strip of insulation extending longitudinally of the cable, said strip having one edge thereof supporting the conductor and having the opposite edge thereof embedded in and supported by the metal of the sheath.

11. An electrical cable comprising a sheath, an electrical conductor within the sheath, a supporting strip of insulation extending longitudinally of the cable, said strip having one edge thereof supporting the conductor and having the opposite edge thereof supported by the sheath, said strip having a perforate portion of substantial extent to reduce the amount of dielectric material adjacent to the conductor.

12. In the art of making an electrical cable comprising a metal sheath and a conductor supported by an insulating strip within the sheath, the method which comprises extruding metal to form the sheath and embedding in the metal of the sheath as the same is extruded one edge of said insulating strip spaced from the conductor for securing the strip to the sheath.

HOBART MASON.